US012165669B2

(12) United States Patent
Villemoes

(10) Patent No.: US 12,165,669 B2
(45) **Date of Patent: *Dec. 10, 2024**

(54) SUBBAND BLOCK BASED HARMONIC TRANSPOSITION

(71) Applicant: DOLBY INTERNATIONAL AB, Dublin (IE)

(72) Inventor: Lars Villemoes, Järfälla (SE)

(73) Assignee: DOLBY INTERNATIONAL AB, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/390,953

(22) Filed: Dec. 20, 2023

(65) Prior Publication Data

US 2024/0127845 A1 Apr. 18, 2024

Related U.S. Application Data

(63) Continuation of application No. 18/192,982, filed on Mar. 30, 2023, now Pat. No. 11,935,555, which is a
(Continued)

(51) Int. Cl.
*G10L 21/038* (2013.01)
*G10L 19/02* (2013.01)
(Continued)

(52) U.S. Cl.
CPC ........ *G10L 21/038* (2013.01); *G10L 19/0204* (2013.01); *G10L 19/022* (2013.01);
(Continued)

(58) Field of Classification Search
CPC .................................................... G10L 21/038
See application file for complete search history.

(56) References Cited

U.S. PATENT DOCUMENTS

| | | | |
|---|---|---|---|
| 6,590,946 | B1 | 7/2003 | Chong |
| 2003/0187663 | A1 | 10/2003 | Truman |

(Continued)

FOREIGN PATENT DOCUMENTS

| | | | |
|---|---|---|---|
| CN | 1272259 | A | 11/2000 |
| CN | 1315033 | A | 9/2001 |

(Continued)

OTHER PUBLICATIONS

Ekstrand, P., et al., "WD Text for USAC CE on Harmonic Transposer" MPEG Meeting Jan. 2010, Kyoto, JP, Motion Picture Expert Group or Iso/Iec JTC1/SC29/WG11.

(Continued)

*Primary Examiner* — Shaun Roberts

(57) ABSTRACT

The present document relates to audio source coding systems which make use of a harmonic transposition method for high frequency reconstruction (HFR), as well as to digital effect processors, e.g. exciters, where generation of harmonic distortion add brightness to the processed signal, and to time stretchers where a signal duration is prolonged with maintained spectral content. A system and method configured to generate a time stretched and/or frequency transposed signal from an input signal is described. The system comprises an analysis filterbank configured to provide an analysis subband signal from the input signal; wherein the analysis subband signal comprises a plurality of complex valued analysis samples, each having a phase and a magnitude. Furthermore, the system comprises a subband processing unit configured to determine a synthesis subband signal from the analysis subband signal using a subband transposition factor Q and a subband stretch factor S. The subband processing unit performs a block based nonlinear processing wherein the magnitude of samples of the synthesis subband signal are determined from the magnitude of corresponding samples of the analysis subband signal and a
(Continued)

predetermined sample of the analysis subband signal. In addition, the system comprises a synthesis filterbank configured to generate the time stretched and/or frequency transposed signal from the synthesis subband signal.

19 Claims, 4 Drawing Sheets

Related U.S. Application Data continuation of application No. 17/751,214, filed on May 23, 2022, now Pat. No. 11,646,047, which is a continuation of application No. 16/908,745, filed on Jun. 23, 2020, now Pat. No. 11,341,984, which is a continuation of application No. 16/135,284, filed on Sep. 19, 2018, now Pat. No. 10,699,728, which is a continuation of application No. 15/822,305, filed on Nov. 27, 2017, now Pat. No. 10,109,296, which is a continuation of application No. 15/644,983, filed on Jul. 10, 2017, now Pat. No. 9,858,945, which is a continuation of application No. 15/226,272, filed on Aug. 2, 2016, now Pat. No. 9,741,362, which is a continuation of application No. 14/512,833, filed on Oct. 13, 2014, now Pat. No. 9,431,025, which is a continuation of application No. 13/514,896, filed as application No. PCT/EP2011/050114 on Jan. 5, 2011, now Pat. No. 8,898,067.

(60) Provisional application No. 61/331,545, filed on May 5, 2010, provisional application No. 61/296,241, filed on Jan. 19, 2010.

(51) Int. Cl.

| | |
|---|---|
| ***G10L 19/022*** | (2013.01) |
| ***G10L 19/032*** | (2013.01) |
| ***G10L 21/04*** | (2013.01) |
| ***G10L 25/18*** | (2013.01) |

(52) U.S. Cl.

CPC ............ *G10L 19/032* (2013.01); *G10L 21/04* (2013.01); *G10L 25/18* (2013.01)

(56) References Cited

U.S. PATENT DOCUMENTS

| | | | |
|---|---|---|---|
| 2003/0212560 | A1 | 11/2003 | Kaneko |
| 2004/0225505 | A1 | 11/2004 | Andersen |
| 2005/0149339 | A1 | 7/2005 | Tanaka |
| 2007/0156398 | A1 | 7/2007 | Hung |
| 2007/0213990 | A1 | 9/2007 | Moon |
| 2007/0276656 | A1 | 11/2007 | Solbach |
| 2008/0140405 | A1 | 6/2008 | Davidson |
| 2009/0138267 | A1 | 5/2009 | Davidson |
| 2009/0234618 | A1 | 9/2009 | Taenzer et al. |
| 2009/0319283 | A1 | 12/2009 | Schnell |
| 2012/0010880 | A1 | 1/2012 | Nagel |

FOREIGN PATENT DOCUMENTS

| | | | |
|---|---|---|---|
| CN | 1206816 | C | 6/2005 |
| CN | 1639770 | A | 7/2005 |
| CN | 101027717 | A | 8/2007 |
| CN | 101031962 | A | 9/2007 |
| CN | 101366078 | A | 2/2009 |
| CN | 101405791 | A | 4/2009 |
| CN | 101617360 | A | 12/2009 |
| CN | 105700923 | A | 6/2016 |
| JP | 2004-053895 | A | 2/2004 |
| JP | 2005-521907 | A | 7/2005 |
| JP | 2007-101871 | A | 4/2007 |
| JP | 2008-129541 | A | 6/2008 |
| JP | 2008-139844 | A | 6/2008 |
| JP | 2006070768 | A1 | 8/2008 |
| JP | 2009-116245 | A | 5/2009 |
| JP | 2011-527452 | A | 10/2011 |
| JP | 2014-002393 | A | 1/2014 |
| RU | 2194361 | C2 | 12/2002 |
| RU | 2256293 | C2 | 7/2005 |
| RU | 2271578 | C2 | 3/2006 |
| RU | 2006126530 | A | 2/2008 |
| RU | 2007116941 | A | 11/2008 |
| WO | 98/57436 | A2 | 12/1998 |
| WO | 02/052545 | A1 | 7/2002 |
| WO | 03/107329 | A1 | 12/2003 |
| WO | 2004/017303 | A1 | 2/2004 |
| WO | 2005/043511 | A1 | 5/2005 |
| WO | 2007/031171 | A1 | 3/2007 |
| WO | 2009/095169 | A1 | 8/2009 |
| WO | 2010/003543 | A1 | 1/2010 |
| WO | 2010/003557 | A1 | 1/2010 |
| WO | 2010/081892 | A3 | 11/2010 |
| WO | 2010/136459 | A1 | 12/2010 |

OTHER PUBLICATIONS

Nagel, F., et al., "A Harmonic Bandwidth Extension Method for Audio Codecs" International Conference on Acoustics, Speech and Signal Processing 2009, Taipei, Apr. 19, 2009, pp. 145-148.
Zhou Huan, et al "Core Experiment on the eSBR Module of USAC" MPEG Meeting Oct. 26-30, 2009.
Zhu, X. et al "Real-Time Signal Estimation from Modified Short-Time Fourier Transform Magnitude Spectra" IEEE Transactions on Audio, Speech, and Language Processing, pp. 1645-1653, vol. 15, Issue 5, Jun. 18, 2007.

SUBBAND BLOCK BASED HARMONIC TRANSPOSITION

CROSS-REFERENCE TO RELATED APPLICATIONS

This application is a continuation of U.S. application Ser. No. 18/192,982 filed Mar. 30, 2023, which is a continuation of U.S. application Ser. No. 17/751,214 filed May 23, 2022, now U.S. Pat. No. 11,646,047 issued on May 9, 2023, which is a continuation of U.S. patent application Ser. No. 16/908,745 filed Jun. 23, 2020, now U.S. Pat. No. 11,341,984 issued on May 24, 2022, which is a continuation of U.S. patent application Ser. No. 16/135,284 filed Sep. 19, 2018, now U.S. Pat. No. 10,699,728 issued on Jun. 30, 2020, which is a continuation of U.S. patent application Ser. No. 15/822,305 filed Nov. 27, 2017, now U.S. Pat. No. 10,109,296 issued on Oct. 23, 2018, which is a continuation of U.S. patent application Ser. No. 15/644,983 filed Jul. 10, 2017, now U.S. Pat. No. 9,858,945 issued on Jan. 2, 2018, which is a continuation of U.S. patent application Ser. No. 15/226,272 filed Aug. 2, 2016, now U.S. Pat. No. 9,741,362 issued on Aug. 22, 2017, which is a continuation application of U.S. patent application Ser. No. 14/512,833 filed Oct. 13, 2014, now U.S. Pat. No. 9,431,025 issued on Aug. 30, 2016, which is a continuation of U.S. patent application Ser. No. 13/514,896 filed Jun. 8, 2012, now U.S. Pat. No. 8,898,067 issued on Nov. 25, 2014, which is a National Phase entry of PCT Patent Application No. PCT/EP2011/050114, having an international filing date of Jan. 5, 2011, which claims priority to U.S. Provisional Patent Application No. 61/331,545 filed May 5, 2010, and U.S. Provisional Patent Application No. 61/296,241 filed Jan. 19, 2010. The contents of all of the above applications are incorporated by reference in their entirety for all purposes.

TECHNICAL FIELD

The present document relates to audio source coding systems which make use of a harmonic transposition method for high frequency reconstruction (HFR), as well as to digital effect processors, e.g. exciters, where generation of harmonic distortion add brightness to the processed signal, and to time stretchers where a signal duration is prolonged with maintained spectral content.

BACKGROUND OF THE INVENTION

In WO 98/57436 the concept of transposition was established as a method to recreate a high frequency band from a lower frequency band of an audio signal. A substantial saving in bitrate can be obtained by using this concept in audio coding. In an HFR based audio coding system, a low bandwidth signal is presented to a core waveform coder and the higher frequencies are regenerated using transposition and additional side information of very low bitrate describing the target spectral shape at the decoder side. For low bitrates, where the bandwidth of the core coded signal is narrow, it becomes increasingly important to recreate a high band with perceptually pleasant characteristics. The harmonic transposition defined in WO 98/57436 performs well for complex musical material in a situation with low cross over frequency. The document WO 98/57436 is incorporated by reference. The principle of a harmonic transposition is that a sinusoid with frequency $\omega$ is mapped to a sinusoid with frequency $Q_\varphi\omega$ where $Q_\varphi>1$ is an integer defining the order of the transposition. In contrast to this, a single sideband modulation (SSB) based HFR maps a sinusoid with frequency $\omega$ to a sinusoid with frequency $\omega+\Delta\omega$ where $\Delta\omega$ is a fixed frequency shift. Given a core signal with low bandwidth, a dissonant ringing artifact will typically result from the SSB transposition. Due to these artifacts, harmonic transposition based HFR are generally preferred over SSB based HFR.

In order to reach an improved audio quality, high quality harmonic transposition based HFR methods typically employ complex modulated filterbanks with a fine frequency resolution and a high degree of oversampling in order to reach the required audio quality. The fine frequency resolution is usually employed to avoid unwanted intermodulation distortion arising from the nonlinear treatment or processing of the different subband signals which may be regarded as sums of a plurality of sinusoids. With sufficiently narrow subbands, i.e. with a sufficiently high frequency resolution, the high quality harmonic transposition based HFR methods aim at having at most one sinusoid in each subband. As a result, intermodulation distortion caused by the nonlinear processing may be avoided. On the other hand, a high degree of oversampling in time may be beneficial in order to avoid an alias type of distortion, which may be caused by the filterbanks and the nonlinear processing. In addition, a certain degree of oversampling in frequency may be necessary to avoid pre-echoes for transient signals caused by the nonlinear processing of the subband signals.

Furthermore, harmonic transposition based HFR methods generally make use of two blocks of filterbank based processing. A first portion of the harmonic transposition based HFR typically employs an analysis/synthesis filterbank with a high frequency resolution and with time and/or frequency oversampling in order to generate a high frequency signal component from a low frequency signal component. A second portion of harmonic transposition based HFR typically employs a filterbank with a relatively coarse frequency resolution, e.g. a QMF filterbank, which is used to apply spectral side information or HFR information to the high frequency component, i.e. to perform the so-called HFR processing, in order to generate a high frequency component having the desired spectral shape. The second portion of filterbanks is also used to combine the low frequency signal component with the modified high frequency signal component in order to provide the decoded audio signal.

As a result of using a sequence of two blocks of filterbanks, and of using analysis/synthesis filterbanks with a high frequency resolution, as well as time and/or frequency oversampling, the computational complexity of harmonic transposition based HFR may be relatively high. Consequently, there is a need to provide harmonic transposition based HFR methods with reduced computational complexity, which at the same time provides good audio quality for various types of audio signals (e.g. transient and stationary audio signals).

SUMMARY OF THE INVENTION

According to an aspect, so-called subband block based harmonic transposition may be used to suppress intermodulation products caused by the nonlinear processing of the subband signals. I.e. by performing a block based nonlinear processing of the subband signals of a harmonic transposer, the intermodulation products within the subbands may be suppressed or reduced. As a result, harmonic transposition which makes use of an analysis/synthesis filterbank with a relatively coarse frequency resolution and/or a relatively low degree of oversampling may be applied. By way of example, a QMF filterbank may be applied.

The block based nonlinear processing of a subband block based harmonic transposition system comprises the processing of a time block of complex subband samples. The processing of a block of complex subband samples may comprise a common phase modification of the complex subband samples and the superposition of several modified samples to form an output subband sample. This block based processing has the net effect of suppressing or reducing intermodulation products which would otherwise occur for input subband signals comprising of several sinusoids.

In view of the fact that analysis/synthesis filterbanks with a relatively coarse frequency resolution may be employed for subband block based harmonic transposition and in view of the fact that a reduced degree of oversampling may be required, harmonic transposition based on block based subband processing may have reduced computational complexity compared with high quality harmonic transposers, i.e. harmonic transposers having a fine frequency resolution and using sample based processing. At the same time, it has been shown experimentally that for many types of audio signals the audio quality which may be reached when using subband block based harmonic transposition is almost the same as when using sample based harmonic transposition. Nevertheless, it has been observed that the audio quality obtained for transient audio signals is generally reduced compared to the audio quality which may be achieved with high quality sample based harmonic transposers, i.e. harmonic transposers using a fine frequency resolution. It has been identified that the reduced quality for transient signals may be due to the time smearing caused by the block processing.

In addition to the quality issues raised above, the complexity of subband block based harmonic transposition is still higher than the complexity of the simplest SSB based HFR methods. This is so because several signals with different transposition orders $Q_\varphi$ are usually required in the typical HFR applications in order to synthesize the required bandwidth. Typically, each transposition order $Q_\varphi$ of block based harmonic transposition requires a different analysis and synthesis filter bank framework.

In view of the above analysis, there is a particular need for improving the quality of subband block based harmonic transposition for transient and voiced signals while maintaining the quality for stationary signals. As will be outlined in the following, the quality improvement may be obtained by means of a fixed or signal adaptive modification of the nonlinear block processing. Furthermore, there is a need for further reducing the complexity of subband block based harmonic transposition. As will be outlined in the following, the reduction of computational complexity may be achieved by efficiently implementing several orders of subband block based transposition in the framework of a single analysis and synthesis filterbank pair. As a result, one single analysis/synthesis filterbank, e.g. a QMF filterbank, may be used for several orders of harmonic transposition $Q_\varphi$. In addition, the same analysis/synthesis filterbank pair may be applied for the harmonic transposition (i.e. the first portion of harmonic transposition based HFR) and the HFR processing (i.e. the second portion of harmonic transposition based HFR), such that the complete harmonic transposition based HFR may rely on one single analysis/synthesis filterbank. In other words, only one single analysis filterbank may be used at the input side to generate a plurality of analysis subband signals which are subsequently submitted to harmonic transposition processing and HFR processing. Eventually, only one single synthesis filterbank may be used to generate the decoded signal at the output side.

According to an aspect a system configured to generate a time stretched and/or frequency transposed signal from an input signal is described. The system may comprise an analysis filterbank configured to provide an analysis subband signal from the input signal. The analysis subband may be associated with a frequency band of the input signal. The analysis subband signal may comprise a plurality of complex valued analysis samples, each having a phase and a magnitude. The analysis filterbank may be one of a quadrature mirror filterbank, a windowed discrete Fourier transform or a wavelet transform. In particular, the analysis filterbank may be a 64 point quadrature mirror filterbank. As such, the analysis filterbank may have a coarse frequency resolution.

The analysis filterbank may apply an analysis time stride $\Delta t_A$ to the input signal and/or the analysis filterbank may have an analysis frequency spacing $\Delta f_A$, such that the frequency band associated with the analysis subband signal has a nominal width $\Delta f_A$ and/or the analysis filterbank may have a number N of analysis subbands, with N>1, where n is an analysis subband index with n=0, . . . , N−1. It should be noted that due to the overlap of adjacent frequency bands, the actual spectral width of the analysis subband signal may be larger than $\Delta f_A$. However, the frequency spacing between adjacent analysis subbands is typically given by the analysis frequency spacing $\Delta f_A$.

The system may comprise a subband processing unit configured to determine a synthesis subband signal from the analysis subband signal using a subband transposition factor Q and a subband stretch factor S. At least one of Q or S may be greater than one. The subband processing unit may comprise a block extractor configured to derive a frame of L input samples from the plurality of complex valued analysis samples. The frame length L may be greater than one, however, in certain embodiments the frame length L may be equal to one. Alternatively or in addition, the block extractor may be configured to apply a block hop size of p samples to the plurality of analysis samples, prior to deriving a next frame of L input samples. As a result of repeatedly applying the block hop size to the plurality of analysis samples, a suite of frames of input samples may be generated.

It should be noted that the frame length L and/or the block hop size p may be arbitrary numbers and do not necessarily need to be integer values. For this or other cases, the block extractor may be configured to interpolate two or more analysis samples to derive an input sample of a frame of L input samples. By way of example, if the frame length and/or the block hope size are fractional numbers, an input sample of a frame of input samples may be derived by interpolating two or more neighboring analysis samples. Alternatively or in addition, the block extractor may be configured to downsample the plurality of analysis samples in order to yield an input sample of a frame of L input samples. In particular, the block extractor may be configured to downsample the plurality of analysis samples by the subband transposition factor Q. As such, the block extractor may contribute to the harmonic transposition and/or time stretch by performing a downsampling operation.

The system, in particular the subband processing unit, may comprise a nonlinear frame processing unit configured to determine a frame of processed samples from a frame of input samples. The determination may be repeated for a suite of frames of input samples, thereby generating a suite of frames of processed samples. The determination may be performed by determining for each processed sample of the frame, the phase of the processed sample by offsetting the phase of the corresponding input sample. In particular, the nonlinear frame processing unit may be configured to determine the phase of the processed sample by offsetting the phase of the corresponding input sample by a phase offset value which is based on a predetermined input sample from the frame of input samples, the transposition factor Q and the subband stretch factor S. The phase offset value may be based on the predetermined input sample multiplied by (QS−1). In particular, the phase offset value may be given by the predetermined input sample multiplied by (QS−1) plus a phase correction parameter θ. The phase correction parameter θ may be determined experimentally for a plurality of input signals having particular acoustic properties.

In a preferred embodiment, the predetermined input sample is the same for each processed sample of the frame. In particular, the predetermined input sample may be the center sample of the frame of input samples.

Alternatively or in addition, the determination may be performed by determining for each processed sample of the frame, the magnitude of the processed sample based on the magnitude of the corresponding input sample and the magnitude of the predetermined input sample. In particular, the nonlinear frame processing unit may be configured to determine the magnitude of the processed sample as a mean value of the magnitude of the corresponding input sample and the magnitude of the predetermined input sample. The magnitude of the processed sample may be determined as the geometric mean value of the magnitude of the corresponding input sample and the magnitude of the predetermined input sample. More specifically, the geometric mean value may be determined as the magnitude of the corresponding input sample raised to the power of (1−ρ), multiplied by the magnitude of the predetermined input sample raised to the power of ρ. Typically, the geometrical magnitude weighting parameter is ρ∈(0,1]. Furthermore, the geometrical magnitude weighting parameter ρ may be a function of the subband transposition factor Q and the subband stretch factor S. In particular, the geometrical magnitude weighting parameter may be $$\rho = 1 - \frac{1}{QS},$$

which results in reduced computational complexity.

It should be noted that the predetermined input sample used for the determination of the magnitude of the processed sample may be different from the predetermined input sample used for the determination of the phase of the processed sample. However, in a preferred embodiment, both predetermined input samples are the same.

Overall, the nonlinear frame processing unit may be used to control the degree of harmonic transposition and/or time stretch of the system. It can be shown that as a result of the determination of the magnitude of the processed sample from the magnitude of the corresponding input sample and from the magnitude of a predetermined input sample, the performance of the system for transient and/or voiced input signals may be improved.

The system, in particular the subband processing unit, may comprise an overlap and add unit configured to determine the synthesis subband signal by overlapping and adding the samples of a suite of frames of processed samples. The overlap and add unit may apply a hop size to succeeding frames of processed samples. This hop size may be equal to the block hop size p multiplied by the subband stretch factor S. As such, the overlap and add unit may be used to control the degree of time stretching and/or of harmonic transposition of the system.

The system, in particular the subband processing unit, may comprise a windowing unit upstream of the overlap and add unit. The windowing unit may be configured to apply a window function to the frame of processed samples. As such, the window function may be applied to a suite of frames of processed samples prior to the overlap and add operation. The window function may have a length which corresponds to the frame length L. The window function may be one of a Gaussian window, cosine window, raised cosine window, Hamming window, Hann window, rectangular window, Bartlett window, and/or Blackman window. Typically, the window function comprises a plurality of window samples and the overlapped and added window samples of a plurality of window functions shifted with a hope size of Sp may provide a suite of samples at a significantly constant value K.

The system may comprise a synthesis filterbank configured to generate the time stretched and/or frequency transposed signal from the synthesis subband signal. The synthesis subband may be associated with a frequency band of the time stretched and/or frequency transposed signal. The synthesis filterbank may be a corresponding inverse filterbank or transform to the filterbank or transform of the analysis filterbank. In particular, the synthesis filterbank may be an inverse 64 point quadrature minor filterbank. In an embodiment, the synthesis filterbank applies a synthesis time stride $\Delta t_S$ to the synthesis subband signal, and/or the synthesis filterbank has a synthesis frequency spacing $\Delta f_S$, and/or the synthesis filterbank has a number M of synthesis subbands, with M>1, where m is a synthesis subband index with m=0, . . . , M−1.

It should be noted that typically the analysis filterbank is configured to generate a plurality of analysis subband signals; the subband processing unit is configured to determine a plurality of synthesis subband signals from the plurality of analysis subband signals; and the synthesis filterbank is configured to generate the time stretched and/or frequency transposed signal from the plurality of synthesis subband signals.

In an embodiment, the system may be configured to generate a signal which is time stretched by a physical time stretch factor $S_\varphi$ and/or frequency transposed by a physical frequency transposition factor $Q_\varphi$. In such a case, the subband stretch factor may be given by $$S = \frac{\Delta t_A}{\Delta t_S} S_\varphi,$$

the subband transposition factor may given by $$Q = \frac{\Delta t_S}{\Delta t_A} Q_\varphi;$$

and/or the analysis subband index n associated with the analysis subband signal and the synthesis subband index m associated with the synthesis subband signal may be related by $$n \approx \frac{\Delta f_S}{\Delta f_A}\frac{1}{Q_\varphi}m.$$

If $$\frac{\Delta f_S}{\Delta f_A}\frac{1}{Q_\varphi}m$$

is a non-integer value, n may be selected as the nearest, i.e. the nearest smaller or larger, integer value to the term $$\frac{\Delta f_S}{\Delta f_A}\frac{1}{Q_\varphi}m.$$

The system may comprise a control data reception unit configured to receive control data reflecting momentary acoustic properties of the input signal. Such momentary acoustic properties may e.g. be reflected by the classification of the input signal into different acoustic property classes. Such classes may comprise a transient property class for a transient signal and/or a stationary property class for a stationary signal. The system may comprise a signal classifier or may receive the control data from a signal classifier. The signal classifier may be configured to analyze the momentary acoustic properties of the input signal and/or configured to set the control data reflecting the momentary acoustic properties.

The subband processing unit may be configured to determine the synthesis subband signal by taking into account the control data. In particular, the block extractor may be configured to set the frame length L according to the control data. In an embodiment, a short frame length L is set if the control data reflects a transient signal; and/or a long frame length L is set if the control data reflects a stationary signal. In other words, the frame length L may be shortened for transient signal portions, compared to the frame length L used for stationary signal portions. As such, the momentary acoustic properties of the input signal may be taken into account within the subband processing unit. As a result, the performance of the system for transient and/or voiced signals may be improved.

As outlined above, the analysis filterbank is typically configured to provide a plurality of analysis subband signals. In particular, the analysis filterbank may be configured to provide a second analysis subband signal from the input signal. This second analysis subband signal is typically associated with a different frequency band of the input signal than the analysis subband signal. The second analysis subband signal may comprise a plurality of complex valued second analysis samples.

The subband processing unit may comprise a second block extractor configured to derive a suite of second input samples by applying the block hop size p to the plurality of second analysis samples. I.e. in a preferred embodiment, the second block extractor applies a frame length L=1. Typically, each second input sample corresponds to a frame of input samples. This correspondence may refer to timing and/or sample aspects. In particular, a second input sample and the corresponding frame of input samples may relate to same time instances of the input signal.

The subband processing unit may comprise a second nonlinear frame processing unit configured to determine a frame of second processed samples from a frame of input samples and from the corresponding second input sample. The determining of the frame of second processed samples may be performed by determining for each second processed sample of the frame, the phase of the second processed sample by offsetting the phase of the corresponding input sample by a phase offset value which is based on the corresponding second input sample, the transposition factor Q and the subband stretch factor S. In particular, the phase offset may be performed as outlined in the present document, wherein the second processed sample takes the place of the predetermined input sample. Furthermore, the determining of the frame of second processed samples may be performed by determining for each second processed sample of the frame the magnitude of the second processed sample based on the magnitude of the corresponding input sample and the magnitude of the corresponding second input sample. In particular, the magnitude may be determined as outlined in the present document, wherein the second processed sample takes the place of the predetermined input sample.

As such, the second nonlinear frame processing unit may be used to derive a frame or a suite of frames of processed samples from frames taken from two different analysis subband signals. In other words, a particular synthesis subband signal may be derived from two or more different analysis subband signals. As outlined in the present document, this may be beneficial in the case where a single analysis and synthesis filterbank pair is used for a plurality of orders of harmonic transposition and/or degrees of time-stretch.

In order to determine one or two analysis subbands which should contribute to a synthesis subband with index m, the relation between the frequency resolution of the analysis and synthesis filterbank may be taken into account. In particular, it may be stipulated that if the term $$\frac{\Delta f_S}{\Delta f_A}\frac{1}{Q_\varphi}m$$

is an integer value n, the synthesis subband signal may be determined based on the frame of processed samples, i.e. the synthesis subband signal may be determined from a single analysis subband signal corresponding to the integer index n. Alternatively or in addition, it may be stipulated that if the term $$\frac{\Delta f_S}{\Delta f_A}\frac{1}{Q_\varphi}m$$

is a non-integer value, with n being the nearest integer value, then the synthesis subband signal may be determined based on the frame of second processed samples, i.e. the synthesis subband signal may be determined from two analysis subband signals corresponding to the nearest integer index value n and a neighboring integer index value. In particular, the second analysis subband signal may be correspond to the analysis subband index n+1 or n−1.

According to a further aspect a system configured to generate a time stretched and/or frequency transposed signal from an input signal is described. This system is particularly adapted to generate the time stretched and/or frequency transposed signal under the influence of a control signal, and to thereby take into account the momentary acoustic properties of the input signal. This may be particularly relevant for improving the transient response of the system.

The system may comprise a control data reception unit configured to receive control data reflecting momentary acoustic properties of the input signal. Furthermore, the system may comprise an analysis filterbank configured to provide an analysis subband signal from the input signal; wherein the analysis subband signal comprises a plurality of complex valued analysis samples, each having a phase and a magnitude. In addition, the system may comprise a subband processing unit configured to determine a synthesis subband signal from the analysis subband signal using a subband transposition factor Q, a subband stretch factor S and the control data. Typically, at least one of Q or S is greater than one.

The subband processing unit may comprise a block extractor configured to derive a frame of L input samples from the plurality of complex valued analysis samples. The frame length L may be greater than one. Furthermore, the block extractor may be configured to set the frame length L according to the control data. The block extractor may also be configured to apply a block hop size of p samples to the plurality of analysis samples, prior to deriving a next frame of L input samples; thereby generating a suite of frames of input samples.

As outlined above, the subband processing unit may comprise a nonlinear frame processing unit configured to determine a frame of processed samples from a frame of input samples. This may be performed by determining for each processed sample of the frame the phase of the processed sample by offsetting the phase of the corresponding input sample; and by determining for each processed sample of the frame the magnitude of the processed sample based on the magnitude of the corresponding input sample.

Furthermore, as outlined above, the system may comprise an overlap and add unit configured to determine the synthesis subband signal by overlapping and adding the samples of a suite of frames of processed samples; and a synthesis filterbank configured to generate the time stretched and/or frequency transposed signal from the synthesis subband signal.

According to another aspect, a system configured to generate a time stretched and/or frequency transposed signal from an input signal is described. This system may be particularly well adapted for performing a plurality of time stretch and/or frequency transposition operations within a single analysis/synthesis filterbank pair. The system may comprise an analysis filterbank configured to provide a first and a second analysis subband signal from the input signal, wherein the first and the second analysis subband signal each comprise a plurality of complex valued analysis samples, referred to as the first and second analysis samples, respectively, each analysis sample having a phase and a magnitude. Typically, the first and the second analysis subband signal correspond to different frequency bands of the input signal.

The system may further comprise a subband processing unit configured to determine a synthesis subband signal from the first and second analysis subband signal using a subband transposition factor Q and a subband stretch factor S. Typically, at least one of Q or S is greater than one. The subband processing unit may comprise a first block extractor configured to derive a frame of L first input samples from the plurality of first analysis samples; the frame length L being greater than one. The first block extractor may be configured to apply a block hop size of p samples to the plurality of first analysis samples, prior to deriving a next frame of L first input samples; thereby generating a suite of frames of first input samples. Furthermore, the subband processing unit may comprise a second block extractor configured to derive a suite of second input samples by applying the block hop size p to the plurality of second analysis samples; wherein each second input sample corresponds to a frame of first input samples. The first and second block extractor may have any of the features outlined in the present document.

The subband processing unit may comprise a nonlinear frame processing unit configured to determine a frame of processed samples from a frame of first input samples and from the corresponding second input sample. This may be performed by determining for each processed sample of the frame the phase of the processed sample by offsetting the phase of the corresponding first input sample; and/or by determining for each processed sample of the frame the magnitude of the processed sample based on the magnitude of the corresponding first input sample and the magnitude of the corresponding second input sample. In particular, the nonlinear frame processing unit may be configured to determine the phase of the processed sample by offsetting the phase of the corresponding first input sample by a phase offset value which is based on the corresponding second input sample, the transposition factor Q and the subband stretch factor S.

Furthermore, the subband processing unit may comprise an overlap and add unit configured to determine the synthesis subband signal by overlapping and adding the samples of a suite of frames of processed samples, wherein the overlap and add unit may apply a hop size to succeeding frames of processed samples. The hop size may be equal to the block hop size p multiplied by the subband stretch factor S. Finally, the system may comprise a synthesis filterbank configured to generate the time stretched and/or frequency transposed signal from the synthesis subband signal.

It should be noted that the different components of the systems described in the present document may comprise any or all of the features outlined with regards to these components in the present document. This is in particular applicable to the analysis and synthesis filterbank, the subband processing unit, the nonlinear processing unit, the block extractors, the overlap and add unit, and/or the window unit described at different parts within this document.

The systems outlined in the present document may comprise a plurality of subband processing units. Each subband processing unit may be configured to determine an intermediate synthesis subband signal using a different subband transposition factor Q and/or a different subband stretch factor S. The systems may further comprise a merging unit downstream of the plurality of subband processing units and upstream of the synthesis filterbank configured to merge corresponding intermediate synthesis subband signals to the synthesis subband signal. As such, the systems may be used to perform a plurality of time stretch and/or harmonic transposition operations while using only a single analysis/synthesis filterbank pair.

The systems may comprise a core decoder upstream of the analysis filterbank configured to decode a bitstream into the input signal. The systems may also comprise an HFR processing unit downstream of the merging unit (if such a merging unit is present) and upstream of the synthesis filterbank. The HFR processing unit may be configured to apply spectral band information derived from the bitstream to the synthesis subband signal.

According to another aspect, a set-top box for decoding a received signal comprising at least a low frequency component of an audio signal is described. The set-top box may comprise a system according to any of the aspects and features outlined in the present document for generating a high frequency component of the audio signal from the low frequency component of the audio signal.

According to a further aspect a method for generating a time stretched and/or frequency transposed signal from an input signal is described. This method is particularly well adapted to enhance the transient response of a time stretch and/or frequency transposition operation. The method may comprise the step of providing an analysis subband signal from the input signal, wherein the analysis subband signal comprises a plurality of complex valued analysis samples, each having a phase and a magnitude.

Overall, the method may comprise the step of determining a synthesis subband signal from the analysis subband signal using a subband transposition factor Q and a subband stretch factor S. Typically at least one of Q or S is greater than one. In particular, the method may comprise the step of deriving a frame of L input samples from the plurality of complex valued analysis samples, wherein the frame length L is typically greater than one. Furthermore, a block hop size of p samples may be applied to the plurality of analysis samples, prior to deriving a next frame of L input samples; thereby generating a suite of frames of input samples. In addition, the method may comprise the step of determining a frame of processed samples from a frame of input samples. This may be performed by determining for each processed sample of the frame the phase of the processed sample by offsetting the phase of the corresponding input sample. Alternatively or in addition, for each processed sample of the frame the magnitude of the processed sample may be determined based on the magnitude of the corresponding input sample and the magnitude of a predetermined input sample.

The method may further comprise the step of determining the synthesis subband signal by overlapping and adding the samples of a suite of frames of processed samples. Eventually the time stretched and/or frequency transposed signal may be generated from the synthesis subband signal.

According to another aspect, a method for generating a time stretched and/or frequency transposed signal from an input signal is described. This method is particularly well adapted for improving the performance of the time stretch and/or frequency transposition operation in conjunction with transient input signals. The method may comprise the step of receiving control data reflecting momentary acoustic properties of the input signal. The method may further comprise the step of providing an analysis subband signal from the input signal, wherein the analysis subband signal comprises a plurality of complex valued analysis samples, each having a phase and a magnitude.

In a following step, a synthesis subband signal may be determined from the analysis subband signal using a subband transposition factor Q, a subband stretch factor S and the control data. Typically, at least one of Q or S is greater than one. In particular, the method may comprise the step of deriving a frame of L input samples from the plurality of complex valued analysis samples, wherein the frame length L is typically greater than one and wherein the frame length L is set according to the control data. Furthermore, the method may comprise the step of applying a block hop size of p samples to the plurality of analysis samples, prior to deriving a next frame of L input samples, in order to thereby generate a suite of frames of input samples. Subsequently, a frame of processed samples may be determined from a frame of input samples, by determining for each processed sample of the frame the phase of the processed sample by offsetting the phase of the corresponding input sample, and the magnitude of the processed sample based on the magnitude of the corresponding input sample.

The synthesis subband signal may be determined by overlapping and adding the samples of a suite of frames of processed samples, and the time stretched and/or frequency transposed signal may be generated from the synthesis subband signal.

According to a further aspect, a method for generating a time stretched and/or frequency transposed signal from an input signal is described. This method may be particularly well adapted for performing a plurality of time stretch and/or frequency transposition operations using a single pair of analysis/synthesis filterbanks. At the same time, the method is well adapted for the processing of transient input signals. The method may comprise the step of providing a first and a second analysis subband signal from the input signal, wherein the first and the second analysis subband signal each comprise a plurality of complex valued analysis samples, referred to as the first and second analysis samples, respectively, each analysis sample having a phase and a magnitude.

Furthermore, the method may comprise the step of determining a synthesis subband signal from the first and second analysis subband signal using a subband transposition factor Q and a subband stretch factor S, wherein at least one of Q or S is typically greater than one. In particular, the method may comprise the step of deriving a frame of L first input samples from the plurality of first analysis samples, wherein the frame length L is typically greater than one. A block hop size of p samples may be applied to the plurality of first analysis samples, prior to deriving a next frame of L first input samples, in order to thereby generate a suite of frames of first input samples. The method may further comprise the step of deriving a suite of second input samples by applying the block hop size p to the plurality of second analysis samples, wherein each second input sample corresponds to a frame of first input samples.

The method proceeds in determining a frame of processed samples from a frame of first input samples and from the corresponding second input sample. This may be performed by determining for each processed sample of the frame the phase of the processed sample by offsetting the phase of the corresponding first input sample, and the magnitude of the processed sample based on the magnitude of the corresponding first input sample and the magnitude of the corresponding second input sample. Subsequently, the synthesis subband signal may be determined by overlapping and adding the samples of a suite of frames of processed samples. Eventually, the time stretched and/or frequency transposed signal may be generated from the synthesis subband signal.

According to another aspect, a software program is described. The software program may be adapted for execution on a processor and for performing the method steps and/or for implementing the aspects and features outlined in the present document when carried out on a computing device.

According to a further aspect, a storage medium is described. The storage medium may comprise a software program adapted for execution on a processor and for performing the method steps and/or for implementing the aspects and features outlined in the present document when carried out on a computing device.

According to another aspect, a computer program product is described. The computer program product may comprise executable instructions for performing the method steps and/or for implementing the aspects and features outlined in the present document when executed on a computer.

It should be noted that the methods and systems including its preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner.

BRIEF DESCRIPTION OF THE DRAWINGS

The present invention will now be described by way of illustrative examples, not limiting the scope or spirit of the invention, with reference to the accompanying drawings, in which.

DESCRIPTION OF PREFERRED EMBODIMENTS

The below-described embodiments are merely illustrative for the principles of the present invention for improved subband block based harmonic transposition. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

Figure 1:
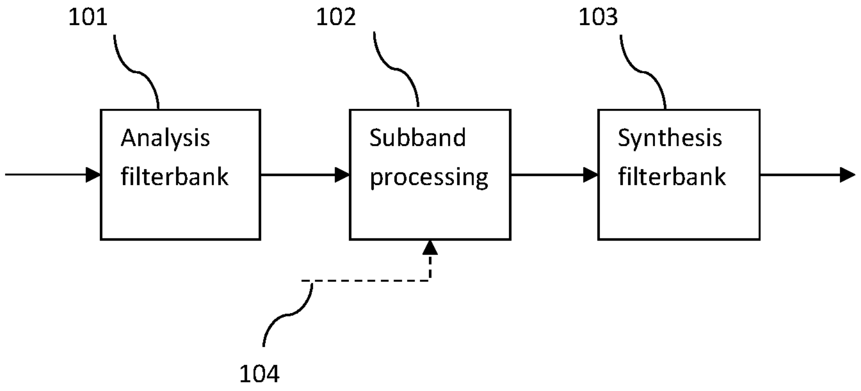
FIG. 1 illustrates the principle of an example subband block based harmonic transposition.

FIG. 1 illustrates the principle of an example subband block based transposition, time stretch, or a combination of transposition and time stretch. The input time domain signal is fed to an analysis filterbank 101 which provides a multitude or a plurality of complex valued subband signals. This plurality of subband signals is fed to the subband processing unit 102, whose operation can be influenced by the control data 104. Each output subband of the subband processing unit 102 can either be obtained from the processing of one or from two input subbands, or even from a superposition of the result of several such processed subbands. The multitude or plurality of complex valued output subbands is fed to the synthesis filterbank 103, which in turn outputs a modified time domain signal. The control data 104 is instrumental to improve the quality of the modified time domain signal for certain signal types. The control data 104 may be associated with the time domain signal. In particular, the control data 104 may be associated with or may depend on the type of time domain signal which is fed into the analysis filterbank 101. By way of example, the control data 104 may indicate if the time domain signal, or a momentary excerpt of the time domain signal, is a stationary signal or if the time domain signal is a transient signal.

Figure 2:
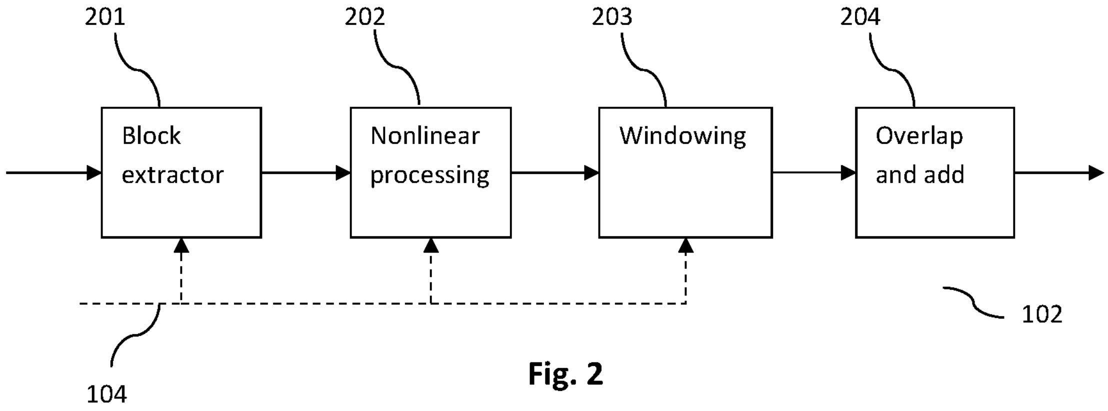
FIG. 2 illustrates the operation of an example nonlinear subband block processing with one subband input.

FIG. 2 illustrates the operation of an example nonlinear subband block processing 102 with one subband input. Given the target values of physical time stretch and/or transposition, and the physical parameters of the analysis and synthesis filterbanks 101 and 103, one deduces subband time stretch and transposition parameters as well as a source subband index, which may also be referred to as an index of the analysis subband, for each target subband index, which may also be referred to as an index of a synthesis subband. The aim of the subband block processing is to implement the corresponding transposition, time stretch, or a combination of transposition and time stretch of the complex valued source subband signal in order to produce the target subband signal.

In the nonlinear subband block processing 102, the block extractor 201 samples a finite frame of samples from the complex valued input signal. The frame may be defined by an input pointer position and the subband transposition factor. This frame undergoes nonlinear processing in the nonlinear processing unit 202 and is subsequently windowed by a finite length window in 203. The window 203 may be e.g. a Gaussian window, a cosine window, a Hamming window, a Hann window, a rectangular window, a Bartlett window, a Blackman window, etc. The resulting samples are added to previously output samples in the overlap and add unit 204 where the output frame position may be defined by an output pointer position. The input pointer is incremented by a fixed amount, also referred to as a block hop size, and the output pointer is incremented by the subband stretch factor times the same amount, i.e. by the block hop size multiplied by the subband stretch factor. An iteration of this chain of operations will produce an output signal with a duration being the subband stretch factor times the input subband signal duration (up to the length of the synthesis window) and with complex frequencies being transposed by the subband transposition factor.

The control data 104 may have an impact to any of the processing blocks 201, 202, 203, 204 of the block based nonlinear processing 102. In particular, the control data 104 may control the length of the blocks extracted in the block extractor 201. In an embodiment, the block length is reduced when the control data 104 indicates that the time domain signal is a transient signal, whereas the block length is increased or maintained at the longer length when the control data 104 indicates that the time domain signal is a stationary signal. Alternatively or in addition, the control data 104 may impact the nonlinear processing unit 202, e.g. a parameter used within the nonlinear processing unit 202, and/or the windowing unit 203, e.g. the window used in the windowing unit 203.

Figure 3:
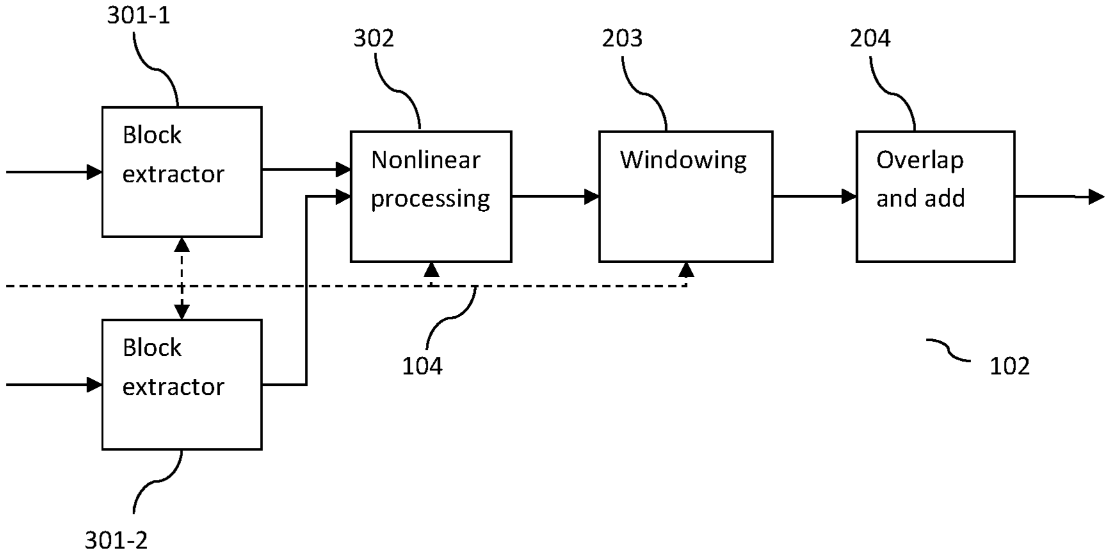
FIG. 3 illustrates the operation of an example nonlinear subband block processing with two subband inputs.

FIG. 3 illustrates the operation of an example nonlinear subband block processing 102 with two subband inputs. Given the target values of physical time stretch and transposition, and the physical parameters of the analysis and synthesis filterbanks 101 and 103, one deduces subband time stretch and transposition parameters as well as two source subband indices for each target subband index. The aim of the subband block processing is to implement the according transposition, time stretch, or a combination of transposition and time stretch of the combination of the two complex valued source subband signals in order to produce the target subband signal. The block extractor 301-1 samples a finite frame of samples from the first complex valued source subband and the block extractor 301-2 samples a finite frame of samples from the second complex valued source subband. In an embodiment, one of the block extractors 301-1 and 301-2 may produce a single subband sample, i.e. one of the block extractors 301-1, 301-2 may apply a block length of one sample. The frames may be defined by a common input pointer position and the subband transposition factor. The two frames extracted in block extractors 301-1, 301-2, respectively, undergo nonlinear processing in unit 302. The nonlinear processing unit 302 typically generates a single output frame from the two input frames. Subsequently, the output frame is windowed by a finite length window in unit 203. The above process is repeated for a suite of frames which are generated from a suite of frames extracted from two subband signals using a block hop size. The suite of output frames is overlapped and added in an overlap and add unit 204. An iteration of this chain of operations will produce an output signal with duration being the subband stretch factor times the longest of the two input subband signals (up to the length of the synthesis window). In case that the two input subband signals carry the same frequencies, the output signal will have complex frequencies transposed by the subband transposition factor.

As outlined in the context of FIG. 2, the control data 104 may be used to modify the operation of the different blocks of the nonlinear processing 102, e.g. the operation of the block extractors 301-1, 301-2. Furthermore, it should be noted that the above operations are typically performed for all of the analysis subband signals provided by the analysis filterbank 101 and for all of the synthesis subband signals which are input into the synthesis filterbank 103.

In the following text, a description of the principles of subband block based time stretch and transposition will be outlined with reference to FIGS. 1-3, and by adding appropriate mathematical terminology.

The two main configuration parameters of the overall harmonic transposer and/or time stretcher are $S_\varphi$: the desired physical time stretch factor; and $Q_\varphi$: the desired physical transposition factor.

The filterbanks 101 and 103 can be of any complex exponential modulated type such as QMF or a windowed DFT or a wavelet transform. The analysis filterbank 101 and the synthesis filterbank 103 can be evenly or oddly stacked in the modulation and can be defined from a wide range of prototype filters and/or windows. Whereas all these second order choices affect the details in the subsequent design such as phase corrections and subband mapping management, the main system design parameters for the subband processing can typically be derived from the knowledge of the two quotients $\Delta t_S/\Delta t_A$ and $\Delta f_S/\Delta f_A$ of the following four filter bank parameters, all measured in physical units. In the above quotients,

- $\Delta t_A$ is the subband sample time step or time stride of the analysis filterbank 101 (e.g. measured in seconds [s]);
- $\Delta t_A$ is the subband frequency spacing of the analysis filterbank 101 (e.g. measured in Hertz [1/s]);
- $\Delta t_S$ is the subband sample time step or time stride of the synthesis filterbank 103 (e.g. measured in seconds [s]); and
- $\Delta f_S$ is the subband frequency spacing of the synthesis filterbank 103 (e.g. measured in Hertz [1/s]).

For the configuration of the subband processing unit 102, the following parameters should be computed:

- S: the subband stretch factor, i.e. the stretch factor which is applied within the subband processing unit 102 in order to achieve an overall physical time stretch of the time domain signal by $S_\varphi$;
- Q: the subband transposition factor, i.e. the transposition factor which is applied within the subband processing unit 102 in order to achieve an overall physical frequency transposition of the time domain signal by the factor $Q_\varphi$; and
- the correspondence between source and target subband indices, wherein n denotes an index of an analysis subband entering the subband processing unit 102, and m denotes an index of a corresponding synthesis subband at the output of the subband processing unit 102.

In order to determine the subband stretch factor S, it is observed that an input signal to the analysis filterbank 101 of physical duration D corresponds to a number $D/\Delta t_A$ of analysis subband samples at the input to the subband processing unit 102. These $D/t\Delta_A$ samples will be stretched to $S\cdot D/\Delta t_A$ samples by the subband processing unit 102 which applies the subband stretch factor S. At the output of the synthesis filterbank 103 these $S\cdot D/\Delta t_A$ samples result in an output signal having a physical duration of $\Delta t_S\cdot S\cdot D/\Delta t_A$. Since this latter duration should meet the specified value $S_\varphi\cdot D$, i.e. since the duration of the time domain output signal should be time stretched compared to the time domain input signal by the physical time stretch factor $S_\varphi$, the following design rule is obtained:

$$S = \frac{\Delta t_A}{\Delta t_S} S_\varphi. \tag{1}$$

In order to determine the subband transposition factor Q which is applied within the subband processing unit 102 in order to achieve a physical transposition $Q_\varphi$, it is observed that an input sinusoid to the analysis filterbank 101 of physical frequency $\Omega$ will result in a complex analysis subband signal with discrete time frequency $\omega=\Omega\cdot\Delta t_A$ and the main contribution occurs within the analysis subband with index $n\approx\Omega/\Delta f_A$. An output sinusoid at the output of the synthesis filterbank 103 of the desired transposed physical frequency $Q_\varphi\cdot\Omega$ will result from feeding the synthesis subband with index $m\approx Q_\varphi\cdot\Omega/\Delta f_S$ with a complex subband signal of discrete frequency $Q_\varphi\cdot\Omega\cdot\Delta t_S$. In this context, care should be taken in order to avoid the synthesis of aliased output frequencies different from $Q_\varphi\cdot\Omega$. Typically this can be avoided by making appropriate second order choices as discussed, e.g. by selecting appropriate analysis/synthesis filterbanks. The discrete frequency $Q_\varphi\cdot\Omega\cdot\Delta t_S$ at the output of the subband processing unit 102 should correspond to the discrete time frequency $\omega=\Omega\cdot\Delta t_A$ at the input of the subband processing unit 102 multiplied by the subband transposition factor Q. I.e. by setting equal $Q\Omega\Delta t_A$ and $Q_\varphi\cdot\Omega\cdot\Delta t_S$, the following relation between the physical transposition factor $Q_\varphi$ and the subband transposition factor Q may be determined:

$$Q = \frac{\Delta t_S}{\Delta t_A} Q_\varphi. \tag{2}$$

Likewise, the appropriate source or analysis subband index n of the subband processing unit 102 for a given target or synthesis subband index m should obey $$n \approx \frac{\Delta f_S}{\Delta f_A} \cdot \frac{1}{Q_\varphi} m. \tag{3}$$

In an embodiment, it holds that $\Delta t_S/\Delta f_A = Q_\varphi$, i.e. the frequency spacing of the synthesis filterbank 103 corresponds to the frequency spacing of the analysis filterbank 101 multiplied by the physical transposition factor, and the one-to-one mapping of analysis to synthesis subband index n=m can be applied. In other embodiments, the subband index mapping may depend on the details of the filterbank parameters. In particular, if the fraction of the frequency spacing of the synthesis filterbank 103 and the analysis filterbank 101 is different from the physical transposition factor $Q_\varphi$, one or two source subbands may be assigned to a given target subband. In the case of two source subbands, it may be preferable to use two adjacent source subbands with index n, n+1, respectively. That is, the first and second source subbands are given by either (n(m), n(m)+1) or (n(m)+1, n(m)).

The subband processing of FIG. 2 with a single source subband will now be described as a function of the subband processing parameters S and Q. Let x(k) be the input signal to the block extractor 201, and let p be the input block stride. I.e. x(k) is a complex valued analysis subband signal of an analysis subband with index n. The block extracted by the block extractor 201 can without loss of generality be considered to be defined by the L=2R+1 samples $$x_l(k)=x(Qk+pl),\ |k|\le R, \tag{4}$$

wherein the integer 1 is a block counting index, L is the block length and R is an integer with R≥0. Note that for Q=1, the block is extracted from consecutive samples but for Q>1 a downsampling is performed in such a manner that the input addresses are stretched out by the factor Q. If Q is an integer this operation is typically straightforward to perform, whereas an interpolation method may be required for non-integer values of Q. This statement is relevant also for non-integer values of the increment p, i.e. of the input block stride. In an embodiment, short interpolation filters, e.g. filters having two filter taps, can be applied to the complex valued subband signal. For instance, if a sample at the fractional time index k+0.5 is required, a two tap interpolation of the form x(k+0.5)≈ax(k)+bx(k+1) may lead to a sufficient quality.

An interesting special case of formula (4) is R=0, where the extracted block consists of a single sample, i.e. the block length is L=1.

With the polar representation of a complex number $z=|z|\exp(i\angle z)$, wherein |z| is the magnitude of the complex number and $\angle z$ is the phase of the complex number, the nonlinear processing unit 202 producing the output frame $y_l$ from the input frame $x_l$ is advantageously defined by the phase modification factor T=SQ through $$\left\{\begin{array}{l} \angle y_l(k) = (T-1)\angle x_l(0) + \angle x_l(k) + \theta \\ |y_l(k)| = |x_l(0)|^{\rho}|x_l(k)|^{1-\rho} \end{array}\right\},\ |k| \le R \tag{5}$$

where $\rho\in[0,1]$ is a geometrical magnitude weighting parameter. The case ρ=0 corresponds to a pure phase modification of the extracted block. The phase correction parameter θ depends on the filterbank details and the source and target subband indices. In an embodiment, the phase correction parameter θ may be determined experimentally by sweeping a set of input sinusoids. Furthermore, the phase correction parameter θ may be derived by studying the phase difference of adjacent target subband complex sinusoids or by optimizing the performance for a Dirac pulse type of input signal. The phase modification factor T should be an integer such that the coefficients T−1 and 1 are integers in the linear combination of phases in the first line of formula (5). With this assumption, i.e. with the assumption that the phase modification factor T is an integer, the result of the nonlinear modification is well defined even though phases are ambiguous by addition of arbitrary integer multiples of 2π.

In words, formula (5) specifies that the phase of an output frame sample is determined by offsetting the phase of a corresponding input frame sample by a constant offset value. This constant offset value may depend on the modification factor T, which itself depends on the subband stretch factor and/or the subband transposition factor. Furthermore, the constant offset value may depend on the phase of a particular input frame sample from the input frame. This particular input frame sample is kept fixed for the determination of the phase of all the output frame samples of a given block. In the case of formula (5), the phase of the center sample of the input frame is used as the phase of the particular input frame sample. In addition, the constant offset value may depend on a phase correction parameter θ which may e.g. be determined experimentally.

The second line of formula (5) specifies that the magnitude of a sample of the output frame may depend on the magnitude of the corresponding sample of the input frame. Furthermore, the magnitude of a sample of the output frame may depend on the magnitude of a particular input frame sample. This particular input frame sample may be used for the determination of the magnitude of all the output frame samples. In the case of formula (5), the center sample of the input frame is used as the particular input frame sample. In an embodiment, the magnitude of a sample of the output frame may correspond to the geometrical mean of the magnitude of the corresponding sample of the input frame and the particular input frame sample.

In the windowing unit 203, a window w of length L is applied on the output frame, resulting in the windowed output frame $$z_l(k)=w(k)y_l(k),\ |k|\le R. \tag{6}$$

Finally, it is assumed that all frames are extended by zeros, and the overlap and add operation 204 is defined by $$z(k) = \sum_l z_l(k - Spl), \tag{7}$$

wherein it should be noted that the overlap and add unit 204 applies a block stride of Sp, i.e. a time stride which is S times higher than the input block stride p. Due to this difference in time strides of formula (4) and (7) the duration of the output signal z(k) is S times the duration of the input signal x(k), i.e. the synthesis subband signal has been stretched by the subband stretch factor S compared to the analysis subband signal. It should be noted that this observation typically applies if the length L of the window is negligible in comparison to the signal duration.

For the case where a complex sinusoid is used as input to the subband processing 102, i.e. an analysis subband signal corresponding to a complex sinusoid $$x(k)=C\exp(i\omega k), \tag{8}$$

it may be determined by applying the formulas (4)-(7) that the output of the subband processing 102, i.e. the corresponding synthesis subband signal, is given by $$z(k) = |C|\exp[i(T\angle C + \theta + Q\omega k)]\sum_l w(k - Spl). \tag{9}$$

Hence a complex sinusoid of discrete time frequency ω will be transformed into a complex sinusoid with discrete time frequency Qω provided the window shifts with a stride of S p sum up to the same constant value K for all k, $$\sum_l w(k - Spl) = K. \tag{10}$$

It is illustrative to consider the special case of pure transposition where S=1 and T=Q. If the input block stride is p=1 and R=0, all the above, i.e. notably formula (5), reduces to the point-wise or sample based phase modification rule $$\begin{Bmatrix} \angle z(k) = T\angle x(k) + \theta \\ |z(k)| = |x(k)| \end{Bmatrix}. \tag{11}$$

The advantage of using a block size R>0 becomes apparent when a sum of sinusoids is considered within an analysis subband signal x(k). The problem with the point-wise rule (11) for a sum of sinusoids with frequencies $\omega_1, \omega_2, \ldots, \omega_N$ is that not only the desired frequencies $Q\omega_1, Q\omega_2, \ldots, Q\omega_N$ will be present in the output of the subband processing 102, i.e. within the synthesis subband signal z(k), but also intermodulation product frequencies of the form $$\sum_n a_n\omega_n.$$

Using a block R>0 and a window satisfying formula (10) typically leads to a suppression of these intermodulation products. On the other hand, a long block will lead to a larger degree of undesired time smearing for transient signals. Furthermore, for pulse train like signals, e.g. a human voice in case of vowels or a single pitched instrument, with sufficiently low pitch, the intermodulation products could be desirable as described in WO 2002/052545. This document is incorporated by reference.

In order to address the issue of relatively poor performance of the block based subband processing 102 for transient signals, it is suggested to use a nonzero value of the geometrical magnitude weighting parameter ρ>0 in formula (5). It has been observed (see e.g. FIG. 7) that the selection of a geometrical magnitude weighting parameter ρ>0 improves the transient response of the block based subband processing 102 compared to the use of pure phase modification with ρ=0, while at the same time maintaining a sufficient power of intermodulation distortion suppression for stationary signals. A particularly attractive value of the magnitude weighting is ρ=1−1/T, for which the nonlinear processing formula (5) reduces to the calculation steps $$\begin{Bmatrix} g_l(k) = \dfrac{x_l(k)}{|x_l(k)|^{1-1/T}} \\ y_l(k) = g_l(0)^{T-1}g_l(k)e^{i\theta} \end{Bmatrix}. \tag{12}$$

These calculation steps represent an equivalent amount of computational complexity compared to the operation of a pure phase modulation resulting from the case of ρ=0 in formula (5). In other words, the determination of the magnitude of the output frame samples based on the geometrical means formula (5) using the magnitude weighting ρ=1−1/T can be implemented without any additional cost in computational complexity. At the same time, the performance of the harmonic transposer for transient signals improves, while maintaining the performance for stationary signals.

As has been outlined in the context of FIGS. 1, 2 and 3, the subband processing 102 may be further enhanced by applying control data 104. In an embodiment, two configurations of the subband processing 102 sharing the same value of K in formula (11) and employing different block lengths may be used to implement a signal adaptive subband processing. The conceptual starting point in designing a signal adaptive configuration switching subband processing unit may be to imagine the two configurations running in parallel with a selector switch at their outputs, wherein the position of the selector switch depends on the control data 104. The sharing of K-value ensures that the switch is seamless in the case of a single complex sinusoid input. For general signals the hard switch on a subband signal level is automatically windowed by the surrounding filterbank framework 101, 103 so as to not introduce any switching artifacts on the final output signals. It can be shown that as a result of the overlap and add process in formula (7) an output identical to that of the conceptual switched system described above can be reproduced at the computational cost of the system of the configuration with the longest block, when the block sizes are sufficiently different, and the update rate of the control data is not too fast. Hence there is no penalty in computational complexity associated with a signal adaptive operation. According to the discussion above, the configuration with the shorter block length is more suitable for transient and low pitched periodical signals, whereas the configuration with longer block length is more suitable for stationary signals. As such, a signal classifier may be used to classify excerpts of an audio signal into a transient class and a non-transient class, and to pass this classification information as control data 104 to the signal adaptive configuration switching subband processing unit 102. The subband processing unit 102 may use the control data 104 to set certain processing parameters, e.g. the block length of the block extractors.

In the following, the description of the subband processing will be extended to cover the case of FIG. 3 with two subband inputs. Only the modifications which are made to the single input case will be described. Otherwise, reference is made to the information provided above. Let x(k) be the input subband signal to the first block extractor 301-1 and let $\tilde{x}(k)$ be the input subband signal to the second block extractor 301-2. The block extracted by block extractor 301-1 is defined by formula (4) and the block extracted by block extractor 301-2 consist of the single subband sample $$\tilde{x}_l(0) = \tilde{x}(pl) \tag{13}$$

I.e. in the outlined embodiment, the first block extractor 301-1 uses a block length of L, whereas the second block extractor 301-2 uses a block length of 1. In such a case, the nonlinear processing 302 produces the output frame $y_l$ may be defined by $$\left\{ \begin{array}{l} \angle y_l(k) = (T-1)\angle \tilde{x}_l(0) + \angle x_l(k) + \theta \\ |y_l(k)| = |\tilde{x}_l(0)|^{\rho} |x_l(k)|^{1-\rho} \end{array} \right\}, \tag{14}$$

and the rest of the processing in 203 and 204 is identical to the processing described in the context of the single input case. In other words, it is suggested to replace the particular frame sample of formula (5) by the single subband sample extracted from the respective other analysis subband signal.

In an embodiment, wherein the ratio of the frequency spacing $\Delta f_S$ of the synthesis filterbank 103 and the frequency spacing $\Delta f_A$ of the analysis filterbank 101 is different from the desired physical transposition factor $Q_\varphi$, it may be beneficial to determine the samples of a synthesis subband with index m from two analysis subbands with index n, n+1, respectively. For a given index m, the corresponding index n may be given by the integer value obtained by truncating the analysis index value n given by formula (3). One of the analysis subband signals, e.g. the analysis subband signal corresponding to index n, is fed into the first block extractor 301-1 and the other analysis subband signal, e.g. the one corresponding to index n+1, is fed into the second block extractor 301-2. Based on these two analysis subband signals a synthesis subband signal corresponding to index m is determined in accordance to the processing outlined above. The assignment of the adjacent analysis subband signals to the two block extractors 301-1 and 302-1 may by based on the remainder that is obtained when truncating the index value of formula (3), i.e. the difference of the exact index value given by formula (3) and the truncated integer value n obtained from formula (3). If the remainder is greater than 0.5, then the analysis subband signal corresponding to index n may be assigned to the second block extractor 301-2, otherwise this analysis subband signal may be assigned to the first block extractor 301-1.

Figure 4:
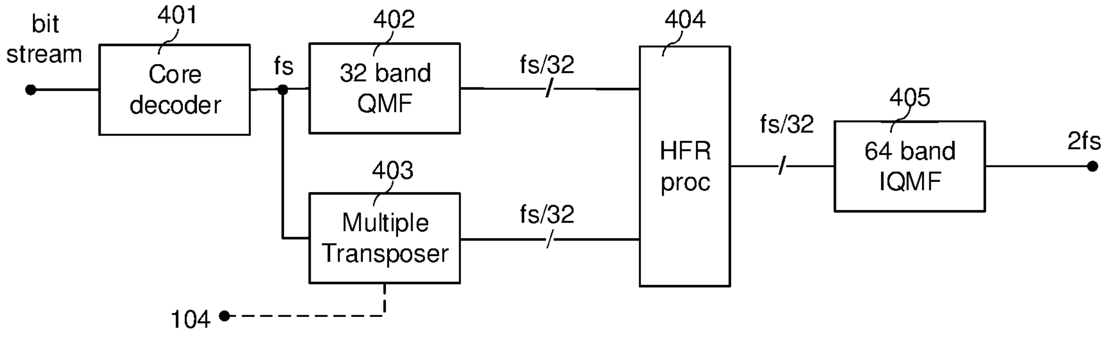
FIG. 4 illustrates an example scenario for the application of subband block based transposition using several orders of transposition in a HFR enhanced audio codec.

FIG. 4 illustrates an example scenario for the application of subband block based transposition using several orders of transposition in a HFR enhanced audio codec. A transmitted bit-stream is received at the core decoder 401, which provides a low bandwidth decoded core signal at a sampling frequency fs. This low bandwidth decoded core signal may also be referred to as the low frequency component of the audio signal. The signal at low sampling frequency fs may be re-sampled to the output sampling frequency 2fs by means of a complex modulated 32 band QMF analysis bank 402 followed by a 64 band QMF synthesis bank (Inverse QMF) 405. The two filterbanks 402 and 405 have the same physical parameters $A\Delta t_S=\Delta t_A$ and $\Delta f_S=\Delta f_A$ and the HFR processing unit 404 typically lets through the unmodified lower subbands corresponding to the low bandwidth core signal. The high frequency content of the output signal is obtained by feeding the higher subbands of the 64 band QMF synthesis bank 405 with the output bands from the multiple transposer unit 403, subject to spectral shaping and modification performed by the HFR processing unit 404. The multiple transposer 403 takes as input the decoded core signal and outputs a multitude of subband signals which represent the 64 QMF band analysis of a superposition or combination of several transposed signal components. In other words, the signal at the output of the multiple transposer 403 should correspond to the transposed synthesis subband signals which may be fed into a synthesis filterbank 103, which in the case of FIG. 4 is represented by the inverse QMF filterbank 405.

Figure 5:
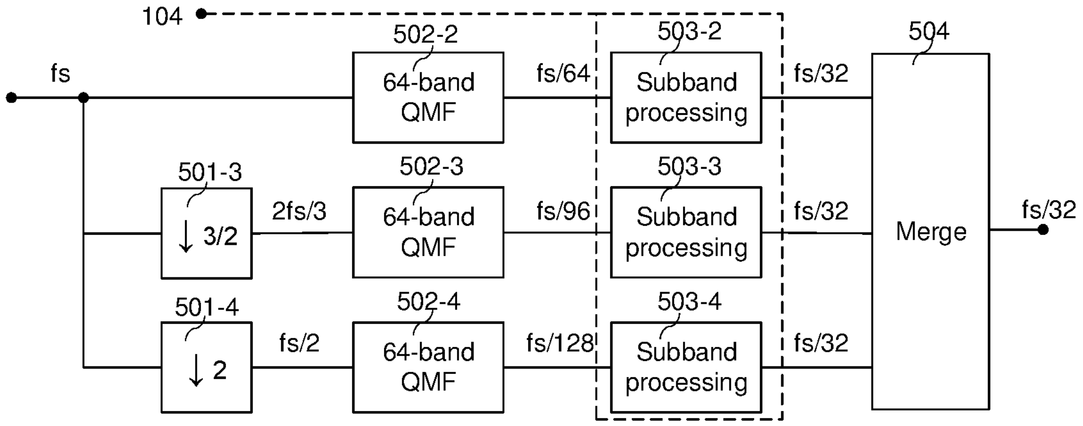
FIG. 5 illustrates an example scenario for the operation of a multiple order subband block based transposition applying a separate analysis filter bank per transposition order.
Figure 6:
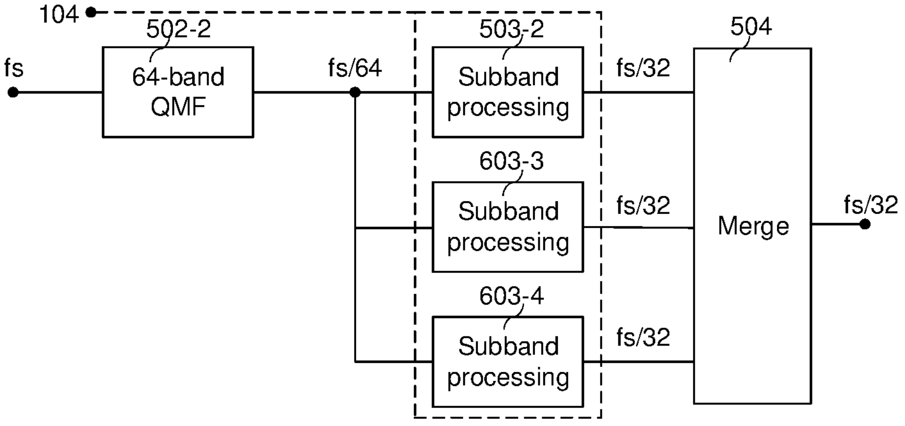
FIG. 6 illustrates an example scenario for the efficient operation of a multiple order subband block based transposition applying a single 64 band QMF analysis filter bank.

Possible implementations of a multiple transposer 403 are outlined in the context of FIGS. 5 and 6. The objective of the multiple transposer 403 is that if the HFR processing 404 is bypassed, each component corresponds to an integer physical transposition without time stretch of the core signal, ($Q_\varphi$=2, 3, . . . , and $S_\varphi$=1). For transient components of the core signal, the HFR processing can sometimes compensate for poor transient response of the multiple transposer 403 but a consistently high quality can typically only be reached if the transient response of the multiple transposer itself is satisfactory. As outlined in the present document, a transposer control signal 104 can affect the operation of the multiple transposer 403, and thereby ensure a satisfactory transient response of the multiple transposer 403. Alternatively or in addition, the above geometric weighting scheme (see e.g. formula (5) and/or formula (14) may contribute to improving the transient response of the harmonic transposer 403.

FIG. 5 illustrates an example scenario for the operation of a multiple order subband block based transposition unit 403 applying a separate analysis filter bank 502-2, 502-3, 502-4 per transposition order. In the illustrated example, three transposition orders $Q_\varphi$=2, 3, 4 are to be produced and delivered in the domain of a 64 band QMF bank operating at output sampling rate 2fs. The merging unit 504 selects and combines the relevant subbands from each transposition factor branch into a single multitude of QMF subbands to be fed into the HFR processing unit.

Consider first the case $Q_\varphi$=2. The objective is specifically that the processing chain of a 64 band QMF analysis 502-2, a subband processing unit 503-2, and a 64 band QMF synthesis 405 results in a physical transposition of $Q_\varphi$=2 with $S_\varphi$=1 (i.e. no stretch). Identifying these three blocks with the units 101, 102 and 103 of FIG. 1, respectively, one finds that $\Delta t_S/\Delta t_A$=½ and $\Delta f_S/\Delta f_A$=2 such that formulas (1)-(3) result in the following specifications for the subband processing unit 503-2. The subband processing unit 503-2 has to perform a subband stretch of S=2, a subband transposition of Q=1 (i.e. none) and a correspondence between source subbands with index n and target subbands with index m given by n=m (see formula (3)).

For the case $Q_\varphi$=3, the exemplary system includes a sampling rate converter 501-3 which converts the input sampling rate down by a factor 3/2 from fs to 2fs/3. The objective is specifically that the processing chain of the 64 band QMF analysis 502-3, the subband processing unit 503-3, and a 64 band QMF synthesis 405 results in a physical transposition of $Q_\varphi$=3 with $S_\varphi$=1 (i.e. no stretch). Identifying the above three blocks with units 101, 102 and 103 of FIG. 1, respectively, one finds due to the resampling that $\Delta t_S/\Delta t_A$=⅓ and $\Delta f_S/\Delta f_A$=3 such that formulas (1)-(3) provide the following specifications for the subband processing unit 503-3. The subband processing unit 503-3 has to perform a subband stretch of S=3, a subband transposition of Q=1 (i.e. none) and a correspondence between source subbands with index n and target subbands with index m given by n=m (see formula (3)).

For the case $Q_\varphi$=4, the exemplary system includes a sampling rate converter 501-4 which converts the input sampling rate down by a factor two from fs to fs/2. The objective is specifically that the processing chain of the 64 band QMF analysis 502-4, the subband processing unit 503-4, and a 64 band QMF synthesis 405 results in a physical transposition of $Q_\varphi$=4 with $S_\varphi$=1 (i.e. no stretch).

Identifying these three blocks of the processing chain with units 101, 102 and 103 of FIG. 1, respectively, one finds due to the resampling that $\Delta t_S/\Delta t_A=1/4$ and $\Delta f_S/\Delta f_A=4$ such that formulas (1)-(3) provide the following specifications for subband processing unit 503-4. The subband processing unit 503-4 has to perform a subband stretch of S=4, a subband transposition of Q=1 (i.e. none) and a correspondence between source subbands with n and target subbands with index m given by n=m.

As a conclusion for the exemplary scenario of FIG. 5, the subband processing units 504-2 to 503-4 all perform pure subband signal stretches and employ the single input non-linear subband block processing described in the context of FIG. 2. When present, the control signal 104 may simultaneously affect the operation of all three subband processing units. In particular, the control signal 104 may be used to simultaneously switch between long block length processing and short block length processing depending on the type (transient or non-transient) of the excerpt of the input signal. Alternatively or in addition, when the three subband processing units 504-2 to 504-4 make use of a nonzero geometrical magnitude weighting parameter $\rho>0$, the transient response of the multiple transposer will be improved compared to the case where $\rho=0$.

FIG. 6 illustrates an example scenario for the efficient operation of a multiple order subband block based transposition applying a single 64 band QMF analysis filter bank. Indeed, the use of three separate QMF analysis banks and two sampling rate converters in FIG. 5 results in a rather high computational complexity, as well as some implementation disadvantages for frame based processing due to the sampling rate conversion 501-3, i.e. a fractional sampling rate conversion. It is therefore suggested to replace the two transposition branches comprising units 501-3→502-3→503-3 and 501-4→502-4→503-4 by the subband processing units 603-3 and 603-4, respectively, whereas the branch 502-2→503-2 is kept unchanged compared to FIG. 5. All three orders of transposition are performed in a filterbank domain with reference to FIG. 1, where $\Delta t_S/\Delta t_A=1/2$ and $\Delta f_S/\Delta f_A=2$. In other words, only a single analysis filterbank 502-2 and a single synthesis filterbank 405 is used, thereby reducing the overall computational complexity of the multiple transposer.

For the case $Q_\varphi=3$, $S_\varphi=1$, the specifications for subband processing unit 603-3 given by formulas (1)-(3) are that the subband processing unit 603-3 has to perform a subband stretch of S=2 and a subband transposition of Q=3/2, and that the correspondence between source subbands with index n and target subbands with index m is given by $n\approx 2m/3$. For the case $Q_\varphi=4$, $S_\varphi=1$, the specifications for subband processing unit 603-4 given by formulas (1)-(3) are that the subband processing unit 603-4 has to perform a subband stretch of S=2 and a subband transposition of Q=2, and that the correspondence between source subbands with index n and target subbands with index m is given by $n\approx 2m$.

It can be seen that formula (3) does not necessarily provide an integer valued index n for a target subband with index m. As such, it may be beneficial to consider two adjacent source subbands for the determination of a target subband as outlined above (using formula (14)). In particular, this may be beneficial for target subbands with index m, for which formula (3) provides a non-integer value for index n. On the other hand, target subbands with index m, for which formula (3) provides an integer value for index n, may be determined from the single source subband with index n (using formula (5)). In other words, it is suggested that a sufficiently high quality of harmonic transposition may be achieved by using subband processing units 603-3 and 603-4 which both make use of nonlinear subband block processing with two subband inputs as outlined in the context of FIG. 3. Moreover, when present, the control signal 104 may simultaneously affect the operation of all three subband processing units. Alternatively or in addition, when the three units 503-2, 603-3, 603-4 make use of a nonzero geometrical magnitude weighting parameter $\rho>0$, the transient response of the multiple transposer may be improved compared to the case where $\rho=0$.

Figure 7:
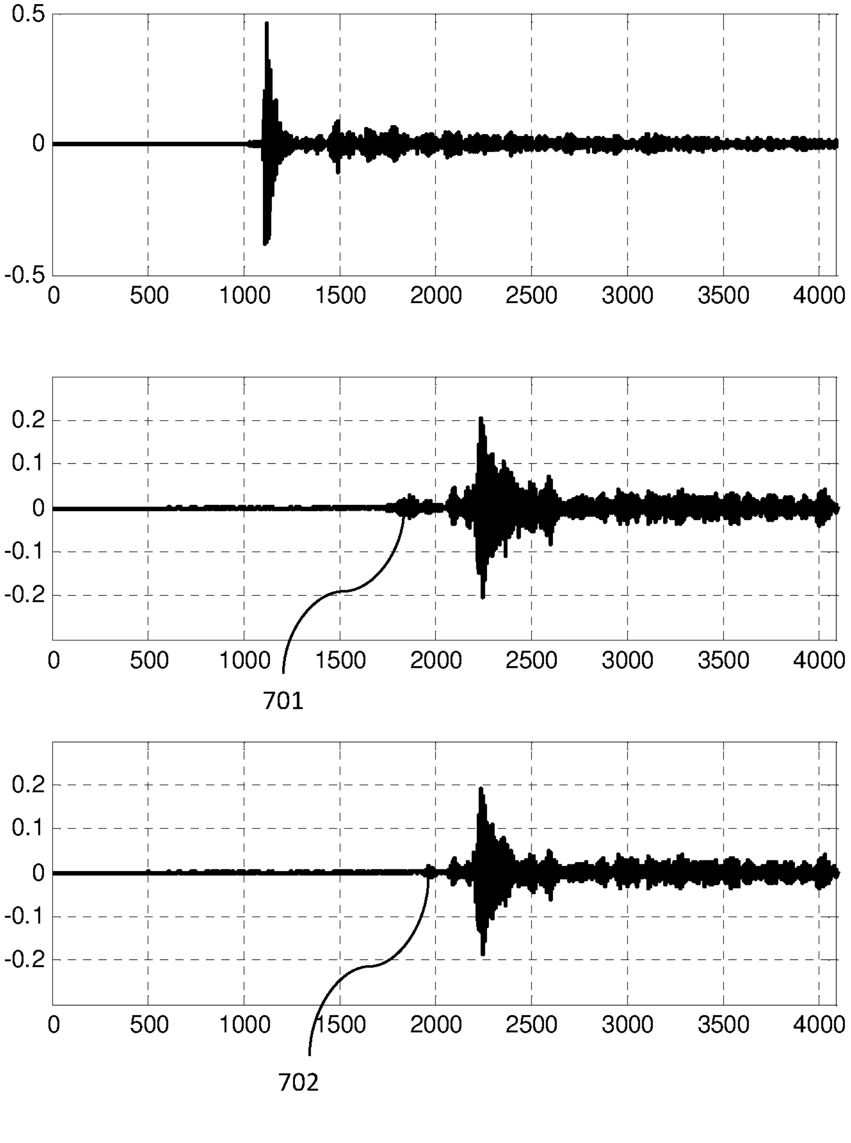
FIG. 7 illustrates the transient response for a subband block based time stretch of a factor two of an example audio signal.

FIG. 7 illustrates an example transient response for a subband block based time stretch of a factor two. The top panel depicts the input signal, which is a castanet attack sampled at 16 kHz. A system based on the structure of FIG. 1 is designed with a 64 band QMF analysis filterbank 101 and a 64 band QMF synthesis filterbank 103. The subband processing unit 102 is configured to implement a subband stretch of a factor S=2, no subband transposition (Q=1) and a direct one-to-one mapping of source to target subbands. The analysis block stride is p=1 and the block size radius is R=7 so the block length is L=15 subband samples which corresponds to 15.64=960 signal domain (time domain) samples. The window w is a raised cosine, e.g. a cosine raised to the power of 2. The middle panel of FIG. 7 depicts the output signal of the time stretching when a pure phase modification is applied by the subband processing unit 102, i.e. the weighting parameter $\rho=0$ is used for the nonlinear block processing according to formula (5). The bottom panel depicts the output signal of the time stretching when the geometrical magnitude weighting parameter $\rho=1/2$ is used for the nonlinear block processing according to formula (5). As can be seen, the transient response is significantly better in the latter case. In particular, it can be seen that the subband processing using the weighting parameter $\rho=0$ results in artifacts 701 which are significantly reduced (see reference numeral 702) with the subband processing using the weighting parameter $\rho=1/2$.

In the present document, a method and system for harmonic transposition based HFR and/or for time stretching has been described. The method and system may be implemented at significantly reduced computational complexity compared to conventional harmonic transposition based HFR, while providing a high quality harmonic transposition for stationary as well as for transient signals. The described harmonic transposition based HFR makes use of block based nonlinear subband processing. The use of signal dependent control data is proposed to adapt the nonlinear subband processing to the type, e.g. transient or non-transient, of the signal. Furthermore, the use of a geometrical weighting parameter is suggested in order to improve the transient response of harmonic transposition using block based non-linear subband processing. Finally, a low complexity method and system for harmonic transposition based HFR is described which makes use of a single analysis/synthesis filterbank pair for harmonic transposition and HFR processing. The outlined methods and systems may be employed in various decoding devices, e.g. in multimedia receivers, video/audio settop boxes, mobile devices, audio players, video players, etc.

The methods and systems for transposition and/or high frequency reconstruction and/or time stretching described in the present document may be implemented as software, firmware and/or hardware. Certain components may e.g. be implemented as software running on a digital signal processor or microprocessor. Other components may e.g. be implemented as hardware and or as application specific integrated circuits. The signals encountered in the described methods and systems may be stored on media such as random access memory or optical storage media. They may be transferred via networks, such as radio networks, satellite networks, wireless networks or wireline networks, e.g. the internet. Typical devices making use of the methods and systems described in the present document are portable electronic devices or other consumer equipment which are used to store and/or render audio signals. The methods and system may also be used on computer systems, e.g. internet web servers, which store and provide audio signals, e.g. music signals, for download.

What is claimed:

1. An audio processing device including a subband processing unit configured to determine a synthesis subband signal from an analysis subband signal; wherein the analysis subband signal comprises a plurality of complex valued analysis samples at different times, each having a phase and a magnitude; wherein the analysis subband signal is associated with a frequency band of an input audio signal; wherein the subband processing unit comprises a block extractor configured to repeatedly derive a frame of L input samples from the plurality of complex valued analysis samples; the frame length L being greater than one; and apply a block hop size of p samples to the plurality of complex valued analysis samples, prior to deriving a next frame of L input samples;

thereby generating a suite of frames of L input samples;

a nonlinear frame processing unit configured to determine a frame of processed samples from a frame of input samples, by determining for each processed sample of the frame:

the phase of the processed sample based on a sum of the phase of the corresponding input sample and the phase of a predetermined input sample scaled by an integer phase modification factor; and the magnitude of the processed sample based on the magnitude of the corresponding input sample; and an overlap and add unit configured to determine the synthesis subband signal by overlapping and adding the samples of a suite of frames of processed samples; wherein the synthesis subband signal is associated with a frequency band of a signal which is time stretched and/or frequency transposed with respect to the input audio signal.

2. The audio processing device of claim 1, wherein the block extractor is configured to downsample the plurality of complex valued analysis samples by a subband transposition factor Q.

3. The audio processing device of claim 1, wherein the block extractor is configured to interpolate two or more complex valued analysis samples to derive an input sample.

4. The audio processing device of claim 1, wherein the nonlinear frame processing unit is configured to determine the magnitude of the processed sample as a mean value of the magnitude of the corresponding input sample and the magnitude of a predetermined input sample.

5. The audio processing device of claim 4, wherein the nonlinear frame processing unit is configured to determine the magnitude of the processed sample as the geometric mean value of the magnitude of the corresponding input sample and the magnitude of the predetermined input sample.

6. The audio processing device of claim 5, wherein the geometric mean value is determined as the magnitude of the corresponding input sample raised to the power of $(1-\rho)$, multiplied by the magnitude of the predetermined input sample raised to the power of $\rho$, wherein the geometrical magnitude weighting parameter $\rho \in (0,1]$.

7. The audio processing device of claim 6, wherein the geometrical magnitude weighting parameter $\rho$ is a function of a subband transposition factor Q and a subband stretch factor S.

8. The audio processing device of claim 7, wherein the geometrical magnitude weighting parameter $$\rho = 1 - \frac{1}{QS}.$$

9. The audio processing device of claim 1, wherein the nonlinear frame processing unit is configured to determine the phase of the processed sample by offsetting the phase of the corresponding input sample by a phase offset value which is based on the phase of the predetermined input sample, a transposition factor Q and a subband stretch factor S.

10. The audio processing device of claim 9, wherein the phase offset value is based on the phase of the predetermined input sample multiplied by (QS−1).

11. The audio processing device of claim 10, wherein the phase offset value is given by the phase of the predetermined input sample multiplied by (QS−1) plus a phase correction parameter $\theta$.

12. The audio processing device of claim 11, wherein the phase correction parameter $\theta$ is determined experimentally for a plurality of input signals having particular acoustic properties.

13. The audio processing device of claim 4, wherein the predetermined input sample is the same for each processed sample of the frame.

14. The audio processing device of claim 13, wherein the predetermined input sample is the center sample of the frame of input samples.

15. The audio processing device of claim 1, wherein the overlap and add unit applies a hop size to succeeding frames of processed samples, the hop size being equal to the block hop size p multiplied by a subband stretch factor S.

16. The audio processing device of claim 1, wherein the subband processing unit further comprises:

a windowing unit upstream of the overlap and add unit and configured to apply a window function to the frame of processed samples.

17. The audio processing device of claim 1, wherein the subband processing unit is configured to determine a plurality of synthesis subband signals from a plurality of analysis subband signals;

the plurality of analysis subband signals is associated with a plurality of frequency bands of the input audio signal; and the plurality of synthesis subband signals is associated with a plurality of frequency bands of the signal which is time stretched and/or frequency transposed with respect to the input audio signal.

18. A method, performed by an audio processing device, for generating a synthesis subband signal that is associated with a frequency band of a signal which is time stretched and/or frequency transposed with respect to an input audio signal, the method comprising:

providing an analysis subband signal which is associated with a frequency band of the input audio signal; wherein the analysis subband signal comprises a plurality of complex valued analysis samples at different times, each having a phase and a magnitude;

deriving a frame of L input samples from the plurality of complex valued analysis samples; the frame length L being greater than one;

applying a block hop size of p samples to the plurality of complex valued analysis samples, prior to deriving a next frame of L input samples; thereby generating a suite of frames of input samples;

determining a frame of processed samples from a frame of input samples, by determining for each processed sample of the frame:

the phase of the processed sample based on a sum of the phase of the corresponding input sample and the phase of a predetermined input sample scaled by an integer phase modification factor; and the magnitude of the processed sample based on the magnitude of the corresponding input sample; and determining the synthesis subband signal by overlapping and adding the samples of a suite of frames of processed samples.

19. A non-transitory storage medium comprising a software program adapted for execution on a processor and for performing the method steps of claim 18 when carried out on an audio processing device.

* * * * *